United States Patent
Xiao et al.

(10) Patent No.: US 8,195,988 B2
(45) Date of Patent: Jun. 5, 2012

(54) METHOD AND APPARATUS FOR HANDLING DISCONNECTION BETWEEN A MEDIA GATEWAY AND A MEDIA GATEWAY CONTROLLER

(75) Inventors: Yu Xiao, Shanghai (CN); Yangming Li, Shanghai (CN); Jing Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/734,540

(22) PCT Filed: Nov. 12, 2007

(86) PCT No.: PCT/CN2007/003202
§ 371 (c)(1),
(2), (4) Date: May 7, 2010

(87) PCT Pub. No.: WO2009/062336
PCT Pub. Date: May 22, 2009

(65) Prior Publication Data
US 2010/0235687 A1  Sep. 16, 2010

(51) Int. Cl.
*G06F 11/00* (2006.01)
(52) U.S. Cl. ............................. 714/55; 714/48
(58) Field of Classification Search .............. 714/48, 714/55, 56; 370/216; 379/190
See application file for complete search history.

(56) References Cited

U.S. PATENT DOCUMENTS

| | | | |
|---|---|---|---|
| 6,674,713 B1 | 1/2004 | Berg et al. | |
| 6,781,979 B1 | 8/2004 | Ebata et al. | |
| 6,944,280 B2 * | 9/2005 | Suzuki | 379/229 |
| 6,961,334 B1 * | 11/2005 | Kaczmarczyk | 370/354 |
| 6,992,974 B1 * | 1/2006 | Tripathi | 370/216 |
| 7,529,184 B2 * | 5/2009 | Willey et al. | 370/229 |
| 7,590,128 B2 * | 9/2009 | Upp et al. | 370/401 |
| 7,843,853 B2 * | 11/2010 | Lin | 370/255 |
| 2002/0141562 A1 * | 10/2002 | Matsuura | 379/220.1 |
| 2006/0089131 A1 * | 4/2006 | Huang | 455/414.1 |
| 2006/0233109 A1 * | 10/2006 | Lin | 370/236 |
| 2007/0127509 A1 * | 6/2007 | Lin | 370/401 |
| 2009/0180390 A1 * | 7/2009 | Lin | 370/252 |

FOREIGN PATENT DOCUMENTS

| | | |
|---|---|---|
| CN | 1812372 A | 8/2006 |
| CN | 1917506 A | 2/2007 |
| EP | 1 615 394 | 1/2006 |
| JP | 2005191799 A | 7/2005 |
| WO | WO 2006/047280 | 5/2006 |

* cited by examiner

*Primary Examiner* — Robert Beausoliel, Jr.
*Assistant Examiner* — Elmira Mehrmanesh
(74) *Attorney, Agent, or Firm* — Carmen Patti Law Group, LLC

(57) ABSTRACT

The present invention relates to a method and apparatus in a Media Gateway (MG) for handling disconnection between the MG and a Media Gateway Controller (MGC). Multilevel requirements are fulfilled by setting different timeout periods for a disconnection timer. On the one hand, if the timeout period of the disconnection timer is not equal to zero, new events that occur during the disconnection are stored. Then, after the connection is recovered, the stored new events are reported to the MGC, so that the data and states in the MG can match those in the MGC after the connection recovery. On the other hand, if the timeout period of the disconnection timer is equal to zero, all active calls are immediately released.

10 Claims, 4 Drawing Sheets

METHOD AND APPARATUS FOR HANDLING DISCONNECTION BETWEEN A MEDIA GATEWAY AND A MEDIA GATEWAY CONTROLLER

BACKGROUND OF THE INVENTION

1. Field of Invention

The present invention relates to the field of communications network, and in particular to a method for handing disconnection between a media gateway and a media gateway controller in an NGN network.

2. Description of Prior Art

An NGN network provides various kinds of services, such as voice communications, multimedia communications and mobility, by using the SoftSwitch technology which separates control, bearer and service from each other. From the point of view of functionality, a SoftSwitch network may be divided into a service layer, a control layer, a transport layer and an access layer, from the top down. The main functional entity within the control layer is a Media Gateway Controller (MGC), which primarily provides functions such as call control, connection control and protocol handling etc., and further provides the service layer with an open interface to various kinds of network resources in the lower layers. The core transport network of the transport layer is an IP packet network, which provides channels for transmitting various kinds of signaling and media streams. The main functional entity of the access layer is a Media Gateway (MG), which converts other kinds of access formats into Real Time Protocol/Real-time Transport Control Protocol (RTP/RTCP) streams suitable for transmission on the IP network.

Between the MGC and the MG, H.248/MGCP protocol is applied, by which the MGC controls the connection, establishment and release of media streams over the MG.

When connection between the MG and the MGC is broken (i.e., the MG detects that the MGC that is currently controlling it fails), the MG attempts to contact the next MGC in a preconfigured list stored thereon, by following the actions specified in Section 11.5 and appendix F.3.6 of H.248. In practice, on the one hand, many telecommunications operators wish that a call could be held during the course of recovery of the connection between the MG and the MGC. The MG preferably holds the call during the course of connection recovery, so that the MGC is able to check the state of the call after the connection is recovered. On the other hand, some MGC are not able to perform such check after the corresponding connections have been recovered. In this case, the telecommunications operators probably wish not to hold a call during the course of connection recovery. However, the existing H.248 protocol can not satisfy the above requirements.

SUMMARY OF THE INVENTION

In order to overcome the above drawbacks in the prior art, the present invention proposes a method and apparatus in the MG for handling the disconnection between the MG and the MGC.

According to an aspect of the present invention, there is provided a method in an MG for handling disconnection between the MG and an MGC, comprising steps of: transmitting a disconnection indication message to the MGC controlling the MG and starting a disconnection timer, when the disconnection between the MG and the MGC is detected; determining the timeout period of the disconnection timer; and storing new events that occur during the timeout period of the disconnection timer, if it is determined that the timeout period of the disconnection timer is not equal to zero.

According to another aspect of the present invention, there is provided an apparatus in an MG for handling disconnection between the MG and an MGC, comprising: a failure detecting means, for detecting the presence of the connection between the MG and the MGC controlling the MG; a transmitting means, for transmitting a disconnection indication message to the MGC controlling the MG, when the disconnection between the MG and the MGC is detected by the failure detecting means; a timer starting means, for starting a disconnection timer when the disconnection between the MG and the MGC is detected by the failure detecting means; a determining means, for determining the timeout period of the disconnection timer; and a synchronizing means, for storing new events that occur during the timeout period of the disconnection timer, if it is determined that the timeout period of the disconnection timer is not equal to zero.

By means of the method and apparatus according to the present invention, flexible configurations fulfilling various kinds of requirements from the telecommunications operators may be achieved and the disconnection between the MG and the MGC may be effectively handled. Therefore, the system performance is improved.

BRIEF DESCRIPTION OF THE DRAWINGS

The advantages of the present invention will become apparent, upon review of the following description in conjunction with the accompanying drawings, in which.

DETAILED DESCRIPTION OF PREFERRED EMBODIMENTS

Figure 1:
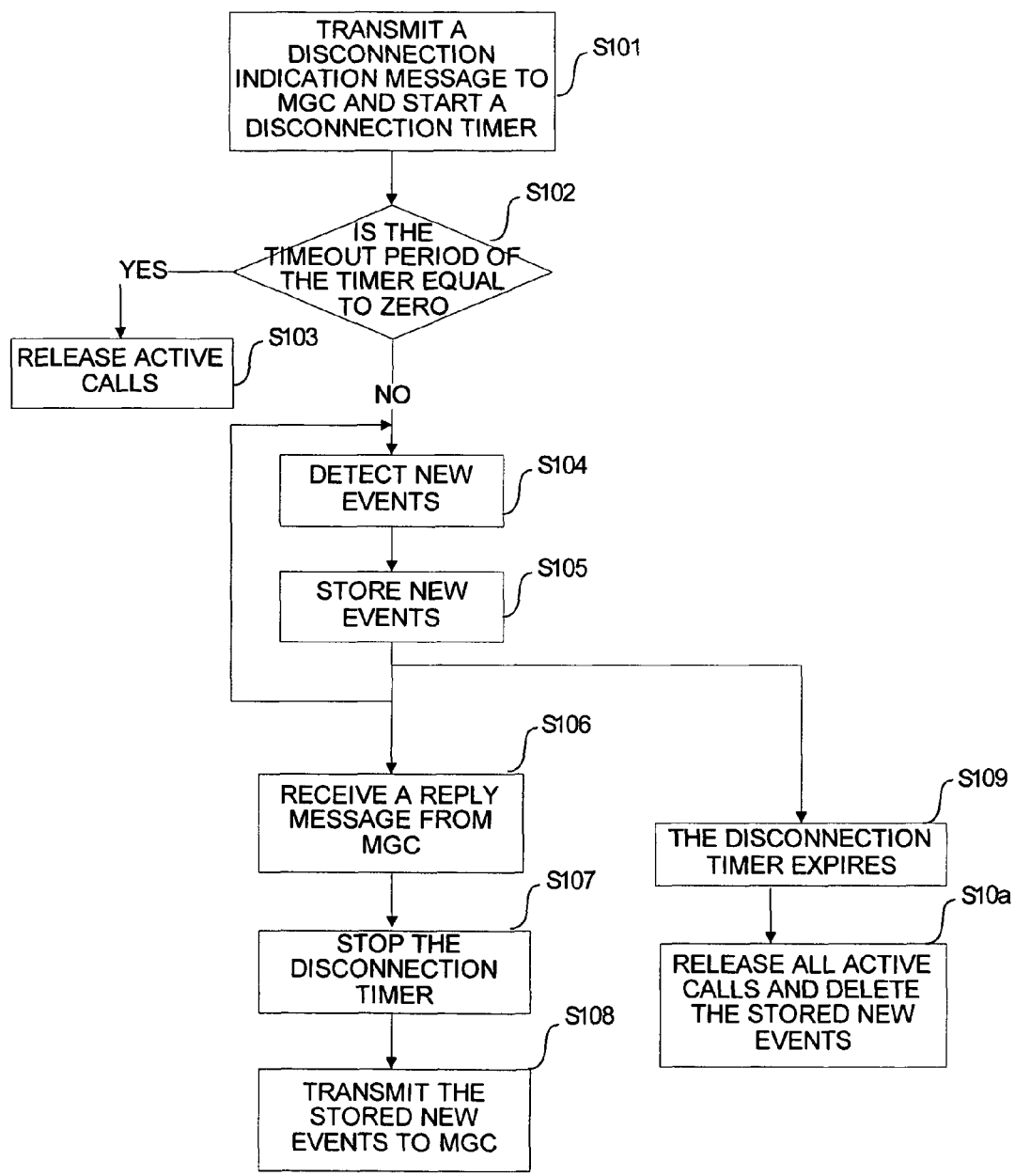
FIG. 1 is a schematic diagram showing a method in a MG for handling disconnection between the MG and a MGC according to an embodiment of the present invention.
Figure 2:
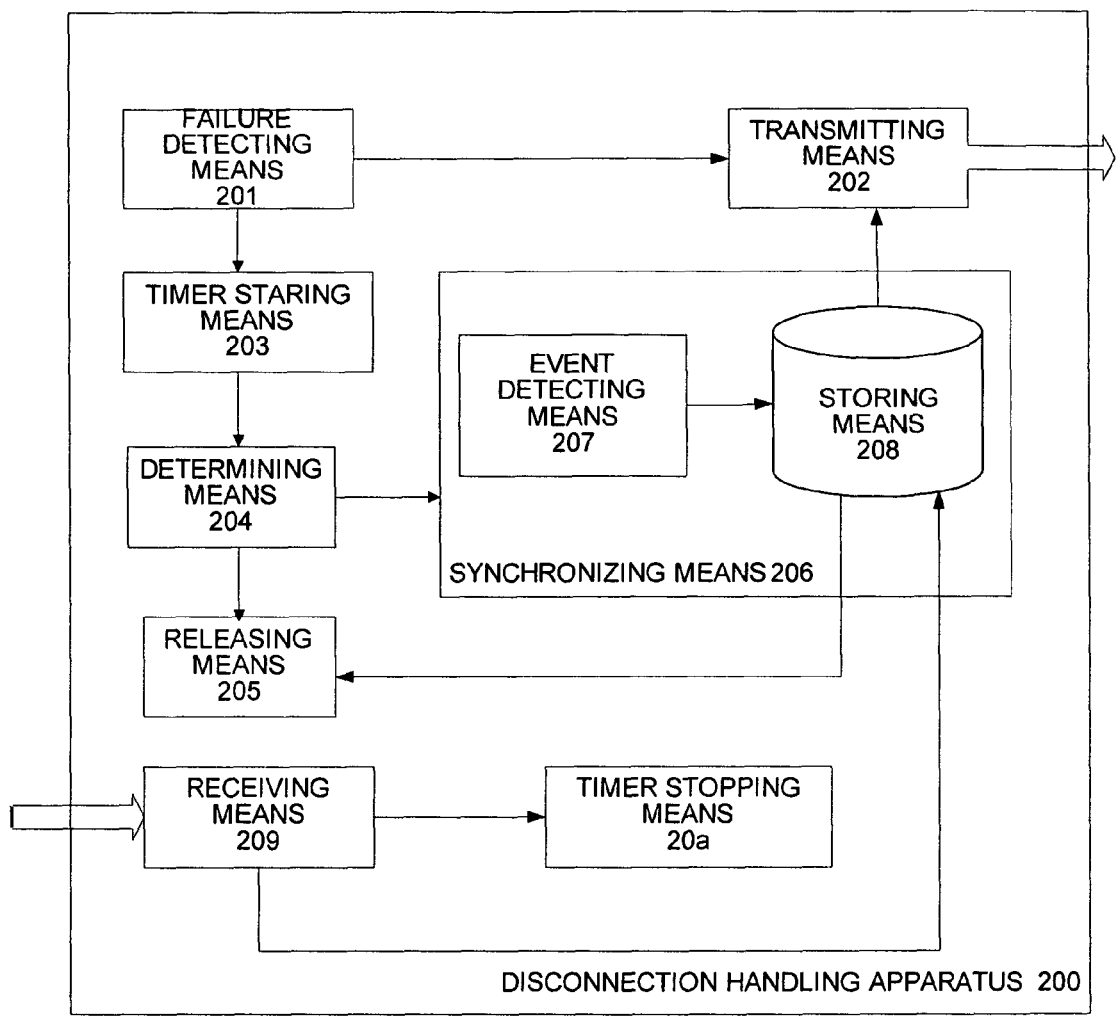
FIG. 2 is a block diagram showing an apparatus in a MG for handling disconnection between the MG and a MGC according to an embodiment of the present invention.

In order to overcome the drawbacks existing in the prior art solutions for handling disconnection between a MG and a MGC as well as to fulfill the multilevel requirements from the telecommunications operators, the present invention proposes a novel method and apparatus in the MG for handling disconnection between the MG and the MGC. The method and apparatus will now be described in conjunction with FIGS. 1 and 2 in detail.

When the MGC fails, the MG may detect disconnection between the MG itself and the MGC controlling it, by a failure detecting means 201 included therein. Then, the MG executes step S101, at which a transmitting means 202 of the MG transmits the MGC that controlled it before the failure a disconnection indication message, such as a ServiceChange message with method=Disconnect. In order to restore the control association in the MG after the connection recovery as its original state before the disconnection, the MG use the User Datagram Protocol (UDP) port in the original control association before the failure, to transmit the ServiceChange message. Meanwhile, the MG starts a disconnection timer by a timer starting means 203. The timeout period of the disconnection timer may be preset in the system, and may be set as different according to different requirements from the operators. Therefore, it is necessary for a determining means 204 in the MG to execute step S102, at which a determination is made as to whether the timeout period of the disconnection timer is equal to zero.

If the determination means 204 determines that the timeout period of the disconnection timer is equal to zero, the MG immediately releases all active calls by its releasing means 205. Specifically, the contexts of the active calls are released and the related resources occupied by the active calls are reset. For fulfilling the operators' requirement not to hold a call when the MGC fails, the timeout period of the disconnection timer may be set to zero.

If the determination means 204 determines that the timeout period of the disconnection timer is not equal to zero, the MG stores corresponding data by a synchronizing means 206 included therein, so that the data and states in the MG can match those in the MGC after the connection recovery.

Specifically, with respect to new events that occur during the disconnection between the MG and the MGC, an event detecting means 207 in the synchronizing means 206 executes step S104 to detect these new events. These new events may be off-hook, hanging-up and dialing etc. There may be a plurality of events or only a single event that occur(s) during the disconnection. The MG executes step S105 for each of the detected new events, at which each new event is stored in a storing means 208. The storing means may be a cache so as to improve the access speed. For those active calls, the contexts thereof and resources occupied by them are retained.

During the timeout period of the disconnection timer, the MG repeatedly executes steps S104 and S105, until it receives a reply message from the MGC or the disconnection timer expires.

If within the timeout period of the disconnection timer the MG receives a reply message from the MGC that controlled it before the failure by its receiving means 209 at step S106, which indicates that the connection between the MG and the MGC is recovered, a timer stopping means 20a included in the MG then executes step S107 to stop the disconnection timer. Next, the MG retrieves the stored new events from its storing means 208, and transmits the stored new events to the MGC by its transmitting means 202 at step S108.

If within the timeout period of the disconnection timer the MG does not receive a reply message from the MGC that controlled it before the failure, the disconnection timer expires at step S109, which indicates that the connection between the MG and the MGC is still not recovered. Next, the MG deletes the new events stored in the storing means 208 and releases all active calls by its releasing means 205 at step S10a.

On the basis of the above method and apparatus, some specific examples will be given in conjunction with FIGS. 3 and 4 as follows. It is assumed that a Terminal A (not shown) is a user terminal managed by an MG 1, an MGC 21 controls an MG 1, and an MGC 22 is the next MGC in a list preconfigured for the MG 1.

Figure 3:
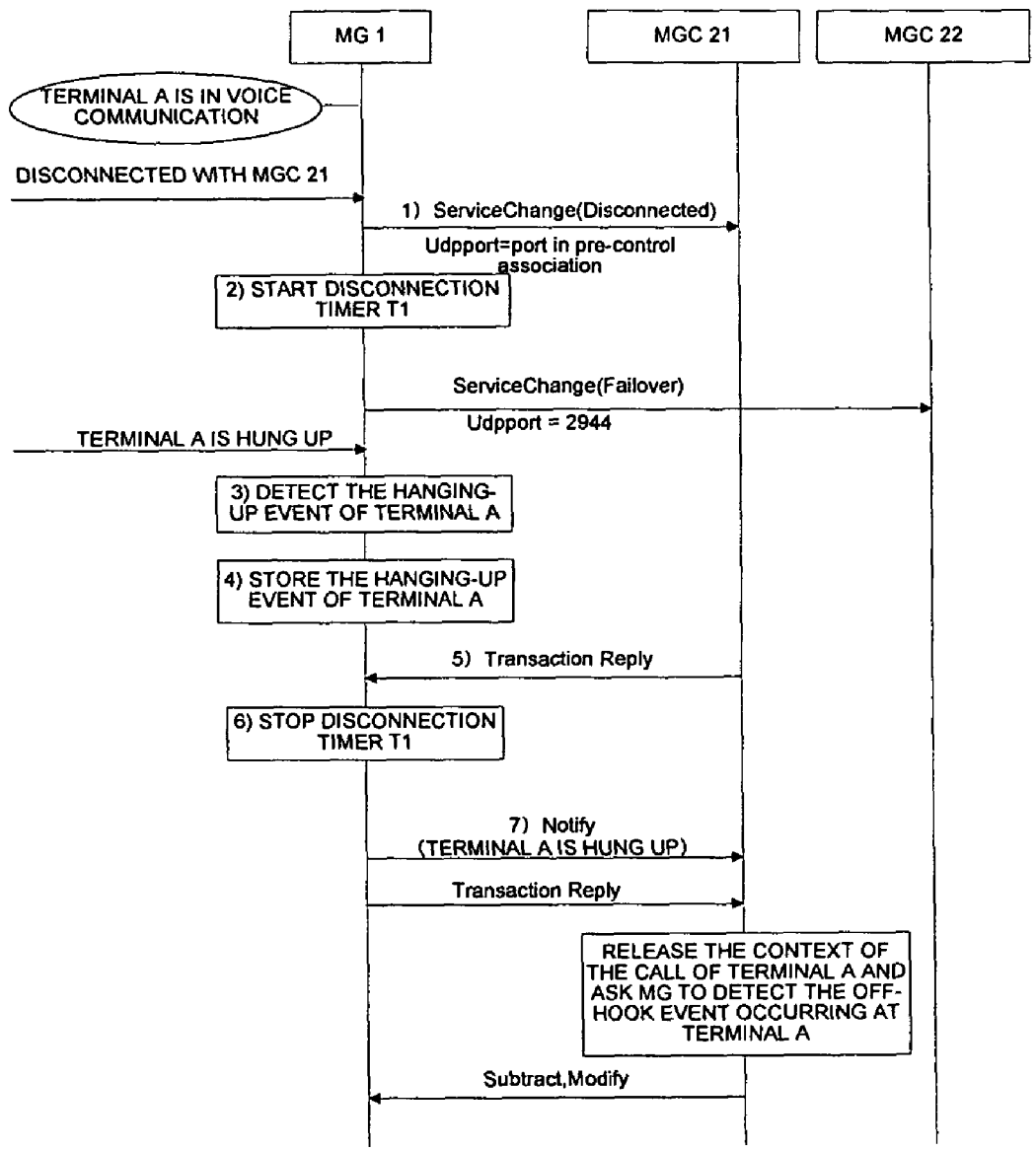
FIG. 3 is a sequence diagram showing a process of handling disconnection between a MG and a MGC according to an embodiment of the present invention.

In FIG. 3, the Terminal A is in voice communication. Then, the MGC 21 fails, the failure detecting means 201 in the MG 1 detects the connection between the MG 1 and the MGC 21 is lost, and the MG 21 triggers the transmitting means 202 to transmit the MGC 21 a ServiceChange message, with method=Disconnect and udp port=udp port in the control association before the failure. Next, the MG 1 starts the disconnection timer T1, and meanwhile transmits the MGC 22 a ServiceChange message, with method=Failover and upd port=2944 by default.

After the voice communication is completed, the Terminal A is hung up. Then, the event detecting means 207 in the MG 1 detects the hanging-up event of the Terminal A, and instructs the storing means 208 to store this event.

Before the disconnection timer T1 expires, the receiving means 209 in the MG 1 receives a reply message (Transaction Reply) from the MGC 21. Then, the timer stopping means 20a stops the timer T1, the storing means 208 retrieves the new event (i.e., the hanging-up event of the Terminal A) stored therein, and a Notify message is transmitted to the MGC 21 by the transmitting means 202 so that the hanging-up event of the Terminal A is informed. The MGC 21 releases the context of the active call of the Terminal A after it receives the Notify message, sets the state of the Terminal A to idle, and instructs the MG 1 to detect whether an off-hook event occurs at the Terminal A. These may be achieved by transmitting a Subtract, Modify message to the MG 1. In this way, after the connection recovery, the MG 1 matches the MGC 21 with respect to the data and states of the Terminal A.

Figure 4:
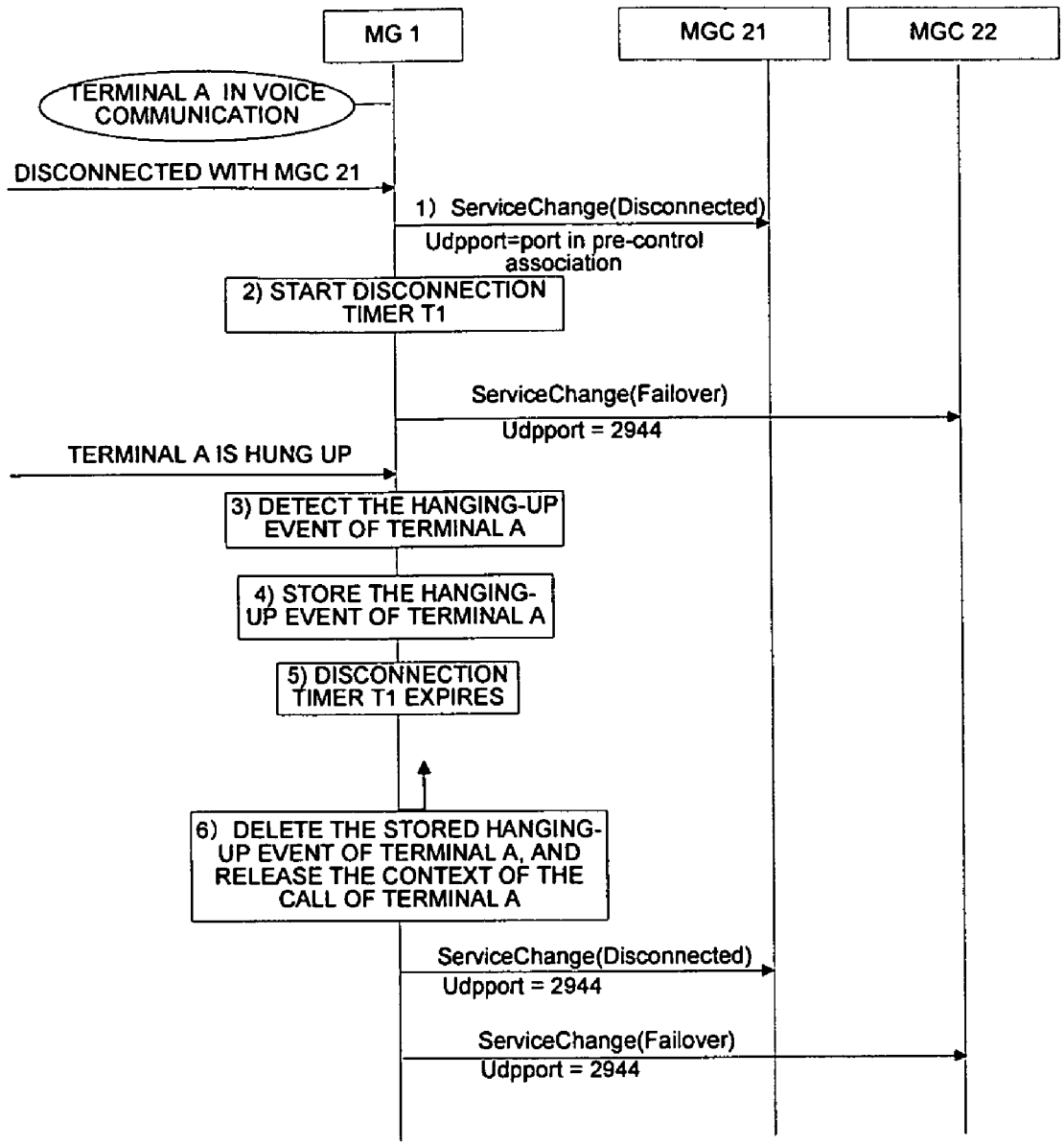
FIG. 4 is a sequence diagram showing another process of handling disconnection between a MG and a MGC according to an embodiment of the present invention.

FIG. 4 is a flow diagram showing a case wherein the connection between the MG 1 and the MGC 1 is still not recovered after the disconnection timer expires. Until the disconnection timer T1 expires, the steps for the MG 1 (that is, step 1 to step 4) are the same as those in FIG. 3. FIG. 4 differs from FIG. 3 in that the MG 1 has not received a reply message from the MGC 21 before the disconnection timer T1 expires. Therefore, once the disconnection timer T1 expires, the MG 1 immediately deletes the stored hanging-up event of the Terminal A and releases the context of the call of the Terminal A by means of the releasing means 205. Thereafter, the MG 1 continues to try to contact MGC 21 and 22. That is, the MG 1 transmits the MGC 21 a ServiceChange message, with method=Disconnect and upd port=2944 by default, and meanwhile transmits the MGC 22 a ServiceChange message, with method=Failover and upd port=2944 by default.

Although several embodiments of the present invention have been shown and described, those skilled in the art should appreciate that various modifications and variations can be made to the above embodiments without departing from the spirit and scope defined by the appended claims and their equivalents.

What is claimed is:

1. A method in a Media Gateway (MG) for handling disconnection between the MG and a Media Gateway Controller (MGC), comprising steps of:
   a) transmitting a disconnection indication message from the MG to the MGC and starting a disconnection timer at the MG, when disconnection between the MG and the MGC controlling the MG is detected;
   b) determining, at the MG, a timeout period of the disconnection timer;
   c) storing, at the MG, new events that occur during the timeout period of the disconnection timer, if it is determined that the timeout period of the disconnection timer is not equal to zero, step c) further comprising sub-steps of:
      c1) detecting, at the MG, the new events that occur during the timeout period of the disconnection timer; and
      c2) storing the new events detected in step c1).

2. The method according to claim 1, further comprising steps of:

d) receiving, at the MG, a reply message from the MGC that controlled the MG before a failure, during the timeout period of the disconnection timer;

e) stopping the disconnection timer; and f) transmitting the new events stored in step c2) to the MGC that controlled the MG before the failure.

3. The method according to claim 1, further comprising steps of:

g) the disconnection timer expiring; and h) releasing, at the MG, all active calls and deleting the new events stored in step c2).

4. The method according to claim 1, further comprising a step of:

i) releasing, at the MG, all active calls, if the timeout period of the disconnection timer is equal to zero.

5. The method according to claim 1, characterized in that, in step a), the MG transmits the disconnection indication message to the MGC that controlled the MG before the failure, by using the communications port through which the MG communicated with the MGC before the failure.

6. An apparatus in a Media Gateway (MG) for handling disconnection between the MG and a Media Gateway Controller (MGC), comprising:

a failure detecting means, for detecting a presence of the connection between the MG and the MGC controlling the MG;

a transmitting means, for transmitting a disconnection indication message from the MG to the MGC controlling the MG, when the disconnection between the MG and the MGC is detected by the failure detecting means;

a timer starting means, for starting a disconnection timer on the MG when the disconnection between the MG and the MGC is detected by the failure detecting means;

a determining means, for determining a timeout period on the MG of the disconnection timer;

a synchronizing means, for storing new events on the MG that occur during the timeout period of the disconnection timer, if it is determined that the timeout period of the disconnection timer is not equal to zero;

a receiving means, for receiving a reply message from the MGC that controlled the MG before the failure, during the timeout period of the disconnection timer;

a timer stopping means, for stopping the disconnection timer; and a transmitting means, for transmitting the new events stored in the MG to the MGC that controlled the MG before the failure.

7. The apparatus according to claim 6, characterized in that the synchronizing means further comprises:

an event detecting means, for detecting the new events that occur during the timeout period of the disconnection timer; and a storing means, for storing the new events detected during the timeout period of the disconnection timer.

8. The apparatus according to claim 6, further comprising:

a releasing means for releasing all active calls and deleting the new events stored in the storing means if the disconnection timer expires.

9. The apparatus according to claim 8, characterized in that the releasing means is further configured to release all active calls if the timeout period of the disconnection timer is equal to zero.

10. The apparatus according to claim 6, characterized in that the transmitting means transmits the disconnection indication message to the MGC that controlled the MG before the failure, by using the communications port through which the MG communicated with the MGC before the failure.

* * * * *